US008390521B2

(12) United States Patent
Hasch et al.

(10) Patent No.: US 8,390,521 B2
(45) Date of Patent: Mar. 5, 2013

(54) ANTENNA ARRAY FOR A RADAR TRANSCEIVER AND CIRCUIT CONFIGURATION FOR SUPPLYING AN ANTENNA ARRAY OF SUCH A RADAR TRANSCEIVER

(75) Inventors: Juergen Hasch, Stuttgart (DE); Ewald Schmidt, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 364 days.

(21) Appl. No.: 12/808,079

(22) PCT Filed: Oct. 21, 2008

(86) PCT No.: PCT/EP2008/064165

§ 371 (c)(1),
(2), (4) Date: Sep. 10, 2010

(87) PCT Pub. No.: WO2009/077235

PCT Pub. Date: Jun. 25, 2009

(65) Prior Publication Data

US 2010/0321268 A1 Dec. 23, 2010

(30) Foreign Application Priority Data

Dec. 17, 2007 (DE) ......................... 10 2007 060 770

(51) Int. Cl.
*H01Q 1/38* (2006.01)
*H01Q 19/10* (2006.01)
*G01S 13/00* (2006.01)

(52) U.S. Cl. ................. 343/700 MS; 343/818; 342/109; 342/70; 342/104; 342/118; 342/157

(58) Field of Classification Search ........... 343/700 MS, 343/817, 818; 342/70, 104, 109, 118, 157
See application file for complete search history.

(56) References Cited

U.S. PATENT DOCUMENTS

| | | | | |
|---|---|---|---|---|
| 7,671,806 | B2 | 3/2010 | Voigtlaender | |
| 7,688,252 | B2 * | 3/2010 | Voigtlander et al. | 342/109 |
| 2009/0040111 | A1 | 2/2009 | Schmidt et al. | |

FOREIGN PATENT DOCUMENTS

| | | |
|---|---|---|
| DE | 102005056756 | 5/2007 |
| WO | WO 2006/072511 | 7/2006 |
| WO | WO 2007/036396 | 4/2007 |

OTHER PUBLICATIONS

International Search Report, PCT International Patent Application No. PCT/EP2008/064165, dated Feb. 23, 2009.

* cited by examiner

*Primary Examiner* — Hoang V Nguyen
(74) *Attorney, Agent, or Firm* — Kenyon & Kenyon LLP

(57) ABSTRACT

An antenna array for radar transceivers, in particular for ascertaining distance and/or speed in the surroundings of vehicles, a first antenna part being situated on a carrier and a second antenna part being situated on another carrier situated at a distance from the first. The first antenna part has two generally rectangular primary exciter patches which adjoin each other on one edge, where they are short-circuited toward ground, two primary exciter patches have two separate supply lines, and the second antenna part comprises two mutually separated rectangular secondary exciter patches, which partially cover the primary exciter patches and which have, in the region of the ground short-circuit of the primary exciter patches, in the beam direction, a distance from each other that at least exposes the ground short-circuit.

9 Claims, 5 Drawing Sheets

ANTENNA ARRAY FOR A RADAR TRANSCEIVER AND CIRCUIT CONFIGURATION FOR SUPPLYING AN ANTENNA ARRAY OF SUCH A RADAR TRANSCEIVER

FIELD OF THE INVENTION

The present invention relates to an antenna array for a radar transceiver, in particular for ascertaining distance and/or speed in the surroundings of vehicles, and a circuit configuration for supplying the primary exciter patches of such an antenna array.

BACKGROUND INFORMATION

Radar transceivers, i.e. transmitting/receiving modules, are used in the microwave and millimeter wave range for locating objects in space or for determining the speed, for example of vehicles. Radar transceivers are also used for example for driver assistance systems, which are used, e.g., for determining the distance of another vehicle traveling ahead of a host vehicle as well as for adaptive cruise control. For the purpose of locating objects in space and for determining the speed, such a radar transceiver emits signals at the highest frequency in the form of electromagnetic waves, which are reflected by the target object and are received again by the radar transceiver and processed. In many cases, several of these radar transceivers are wired up to form an overall module.

A radar sensor is described in German Patent Application No. DE 10 2005 056 756 A1, in which a part of the antenna is situated directly on a semiconductor circuit, while a second part is situated on a carrier that is positioned at a distance above the first part. Such a radar sensor generally has an antenna characteristic, i.e., a beam characteristic, that is predetermined by the type of construction.

SUMMARY

An object of the present invention is to develop an antenna array in such a way that it is usable for different beam characteristics. In particular, it is to be used as a monopulse antenna. Monopulse antennas are antenna groups, the individual antennas of which are not merely interconnected to form a sum, but in which other circuit options may be implemented as well. In particular, various differences may be formed for different purposes. By comparing the amplitudes of the sum channel and various difference channels for example, it is thus possible to locate the reflecting object within the radar beam. It is also possible to form a difference channel by an antiphase coupling of the left to the right antenna groups.

An example antenna array according to the present invention for a radar transceiver and the circuit configuration for supplying the primary exciter patches of such an antenna array may advantageously allow for the antenna to be operated according to the so-called monopulse method. In particular, it becomes possible to switch between two antenna characteristics. This makes it possible to achieve an angular measurement that is extraordinarily advantageous in a radar sensor. It is particularly advantageous that the antenna array according to the present invention allows for the monopulse principle to be used for an antenna design that has primary exciters situated on a carrier, in particular a chip. This allows for a simple manufacture and a simple operation.

Thus, an advantageous specific embodiment provides for the one carrier to be a chip. The example embodiment of the carrier as a chip has the great advantage of allowing the antenna array to be implemented on a semiconductor circuit having an integrated primary exciter. In this regard, it is particularly advantageous if no additional external components are required for operating such an antenna array. In particular, the chip may also contain the circuit device for controlling the primary exciter patches. It is also possible, however, to develop this carrier as a circuit board, as a soft board substrate or a circuit film.

The other, additional carrier may be a circuit board and/or a soft board substrate or a circuit film.

A particularly preferred specific embodiment provides for the two carriers to be fastened to each other and contacted using flip chip connections. Advantageously, these flip-chip connections are generally implemented by generally spherical soldering connections. In this manner, it is possible to achieve a very simple manufacture and at the same time good contacts.

With respect to the position of the secondary exciter patches, various specific embodiments are possible.

A first advantageous specific embodiment provides for both secondary exciter patches to be situated either on the top side or on the bottom side of the additional carrier or one on the top side and the other on the bottom side of the additional carrier.

The position is generally a function of the frequency at which the antenna array is operated and depends on the field of application. In addition to this position of the secondary exciter patches above the primary exciter patches, the height of the contact elements, which amounts, e.g., to 70 μm, and the thickness of the circuit film, which may vary, e.g., between 50 and 300 μm, are, aside from the material properties, the determining main parameters for optimizing the dimensions of the primary exciter patches and the secondary exciter patches.

The supply terminals of the primary exciter patches are connected on the longitudinal edges of the primary exciter patches. The terminal positions of the supply lines may basically be chosen at will and are merely determined by a specifiable desired impedance. The (end) positions of the supply terminals on the primary patches are selected as a function of a desired input impedance of the antenna.

Not only to protect the antenna array against environmental effects, but also with a view to achieving optimal electrical properties of the antenna, there may be a further provision of introducing an encapsulating material embedding the primary exciter patches and the secondary exciter patches into the space between the two carriers or to introduce a so-called underfiller on an epoxide resin basis and to use it to fill this space.

Such an antenna is operated using a circuit configuration for supplying the primary exciter patch, which has a switching device, in the first switch position of which a high-frequency signal may be applied on the supply terminal of the first primary exciter patch and a high-frequency signal having a phase shift around 180° may be applied on the supply terminal of the second primary exciter patch, and in the second switch position of which respectively an in-phase high-frequency signal may be applied on the supply line of the first primary exciter patch and on the supply line of the second primary exciter patch.

These two switch positions allow for two different antenna characteristics, namely, a sum antenna characteristic having only one beam cone and a difference antenna characteristic having two beam cones. Another advantageous specific embodiment additionally provides for controlling the amplitude of the high-frequency signal that is applied on one of the two supply terminals. This makes it possible to achieve a swiveling of the antenna characteristic.

BRIEF DESCRIPTION OF THE DRAWINGS

Exemplary embodiments of the present invention are shown in the figures and explained in greater detail below.

DETAILED DESCRIPTION OF EXAMPLE EMBODIMENTS

Figure 1:
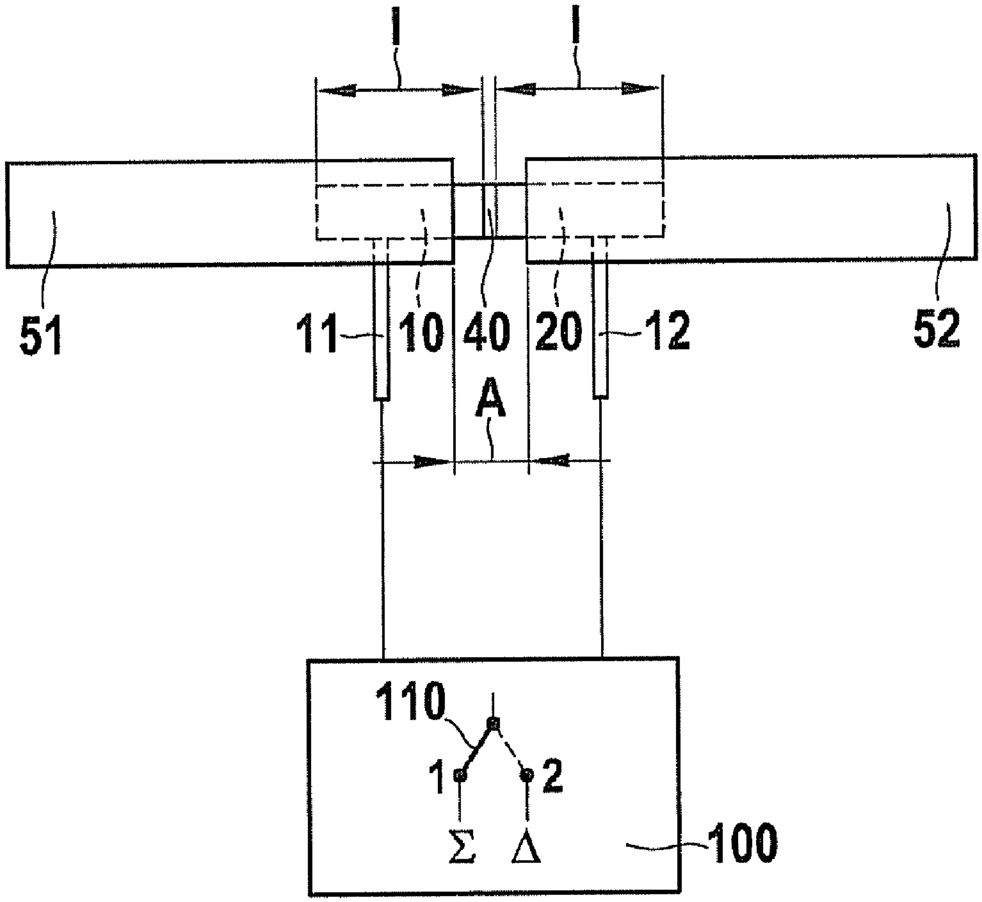
FIG. 1 shows a schematic top view of the structure of an example antenna array according to the present invention together with an example circuit device according to the present invention.
Figure 2:
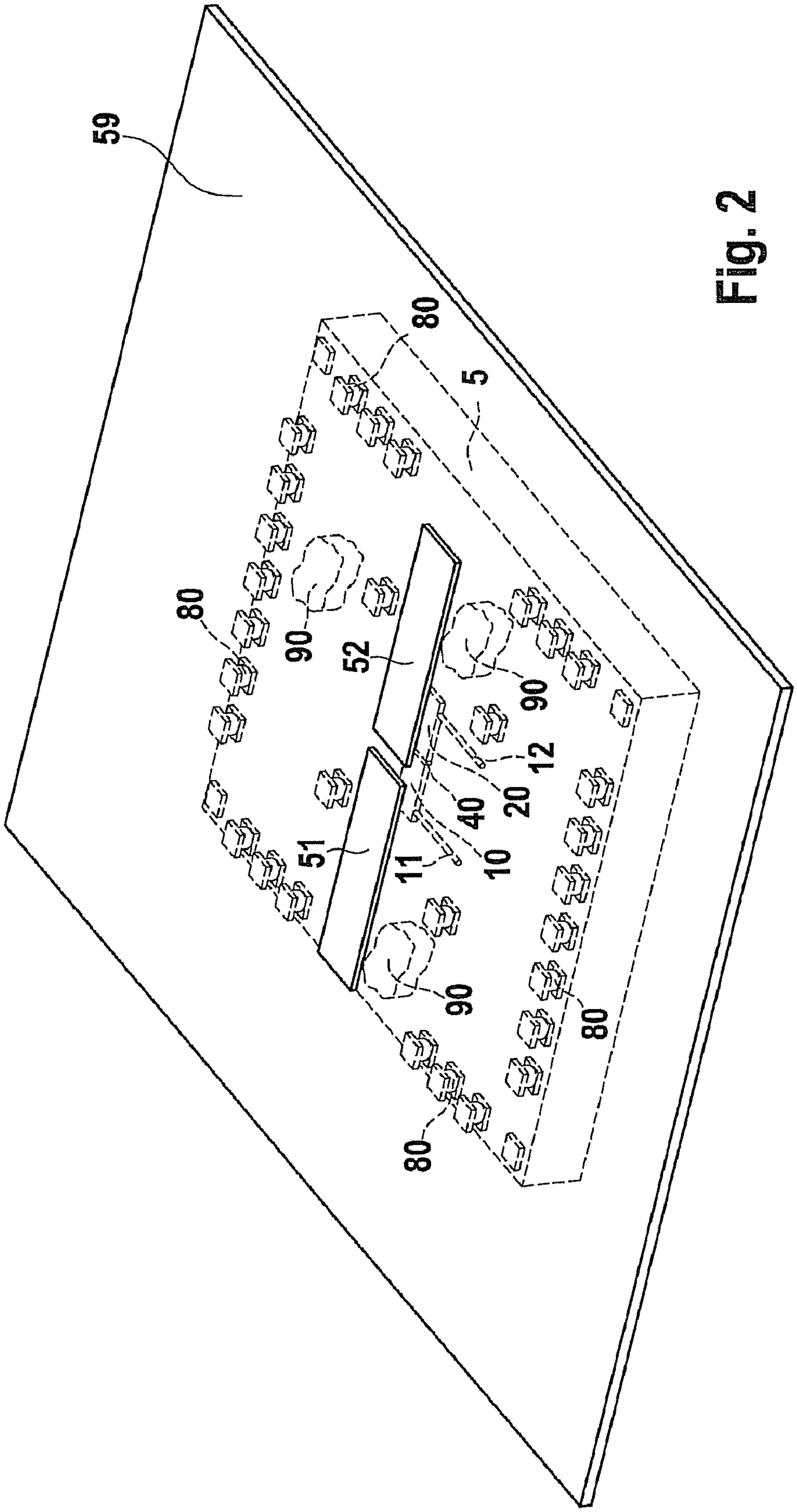
FIG. 2 shows an isometric view of the structure of an example antenna array on a semiconductor chip.

FIG. 1 and FIG. 2 schematically show an antenna array for a radar transceiver, in particular for ascertaining distance and/or speed in the surroundings of vehicles.

A first antenna part is situated on a carrier, for example on a chip 5. The first antenna part has two generally rectangular primary exciter patches, a first primary exciter patch 10 and a second primary exciter patch 20, which adjoin each other on a narrow edge, where they are jointly short-circuited toward ground via a ground connection 40. The two primary exciter patches 10, 20 each have a length l, which corresponds approximately to a fourth of the wavelength of the mm or μm wave to be emitted.

On the end of primary exciter patches 10, 20 facing away from ground connection 40, the electromagnetic wave takes off and excites the secondary exciter patches 51, 52 situated above primary exciter patches 10, 20. Secondary exciter patches 51, 52 are situated at a specifiable distance above primary exciter patches 10, 20—as shown schematically in FIG. 2. The selection of the distance depends on the wavelength of the emitted radar beam and is approximately between 100 and 150 μm.

Secondary exciter patches 51, 52 are situated for example on another carrier 59, which is represented in FIG. 2 as transparent for a better overview. This carrier 59 may be a film, a circuit board, a soft board substrate or a circuit film.

Carrier 5 is preferably connected and contacted with carrier 59 via flip-chip connections 80.

The first primary exciter patch 10 is connected to a supply line 11. Second primary exciter patch 20 has a separate supply line 12. Supply lines 11, 12 contact an edge of first and second primary exciter patch 10, 20 and lead into first and second primary exciter patches 10, 20. The choice of the position, at which supply lines 11, 12 respectively lead into first and second primary exciter patch 10, 20, may be made at will, it being generally determined by a specifiable input impedance. This means that the position is chosen in such a way that a desired input impedance is achieved.

The space between carrier 5 and the additional carrier 59 may be filled by an encapsulating material 90, in particular a silicone gel or a so-called underfiller on epoxide resin basis, which embeds primary exciter patches 10, 20 and secondary exciter patches 51, 52. Not only is the antenna array thereby protected, but this measure in particular also allows for the radar antenna array to be optimized—in addition to the choice of the height of the contact elements, which is preferably, e.g., 70 μm, and the choice of the thickness of the circuit film, which is preferably between 50 and 300 μm.

Figure 3:
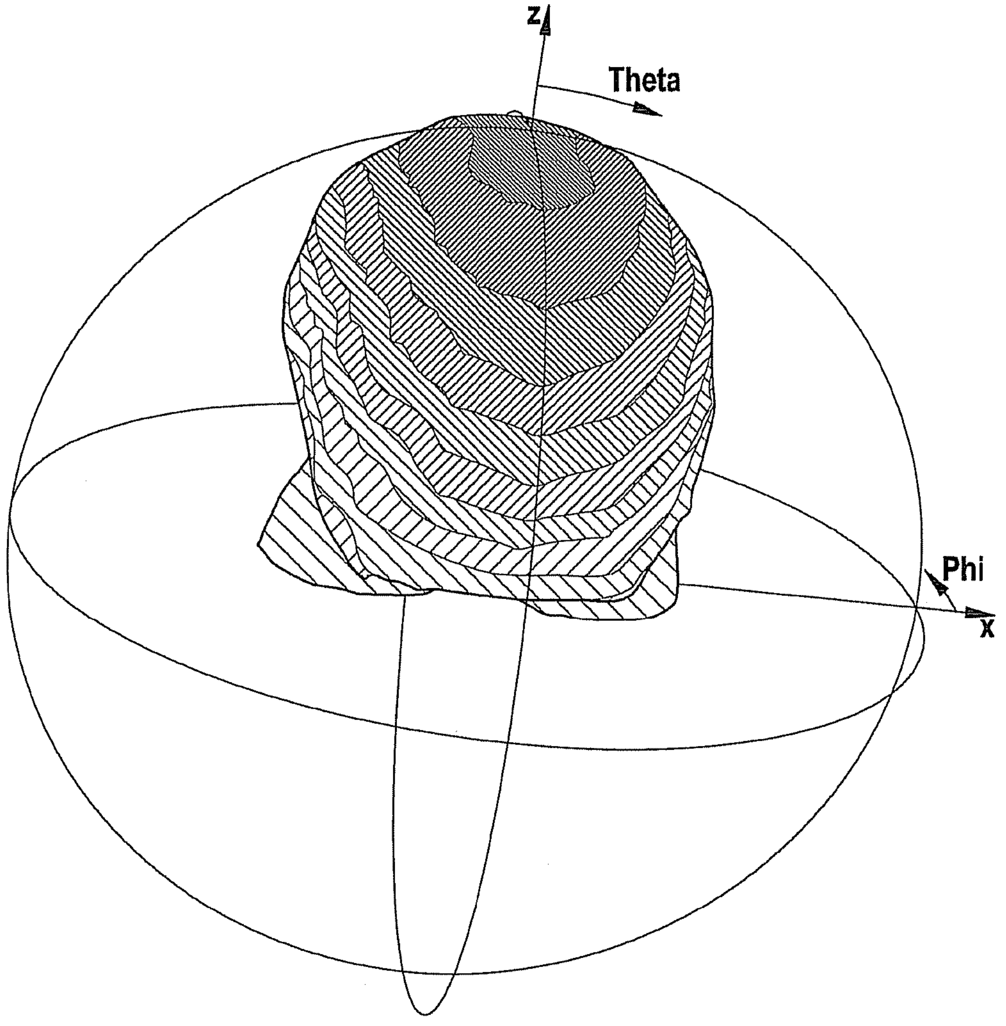
FIG. 3 shows the antenna characteristic according to a first switch position of the switching device.

For supplying the two primary exciter patches 10, 20, a circuit configuration 100, shown schematically in FIG. 1, is provided, which has a switching device 110 for switching between two switch positions 1, 2. In a first switch position 1, the two supply lines 11, 12 are each supplied with high-frequency signals, which have a phase shift of 180° (switch position Σ—sum). This means, for example, that a high-frequency signal having a phase P is supplied to supply line 11 and a high-frequency signal having a phase P+180° is supplied to supply line 12. This results in the "sum" antenna characteristic shown in FIG. 3 having a single beam cone.

Figure 4:
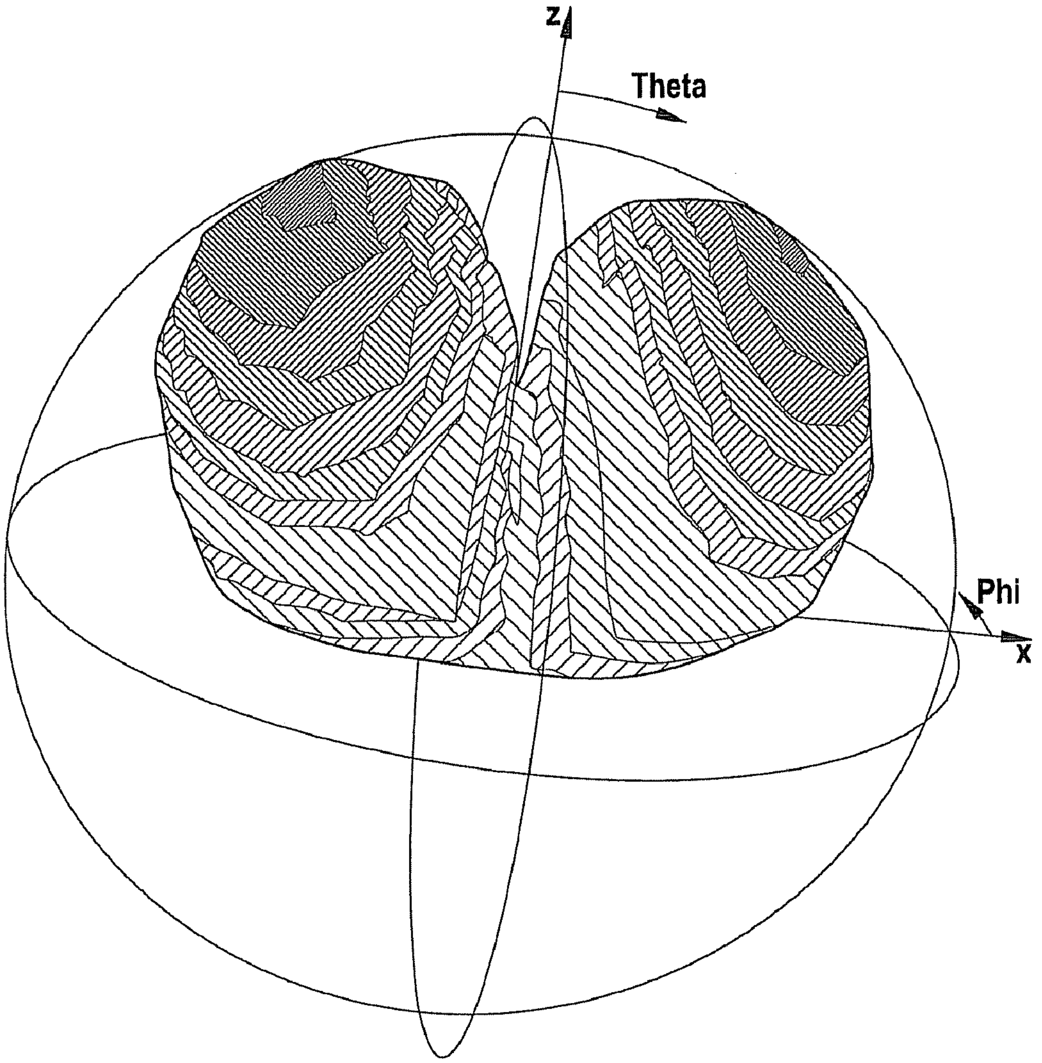
FIG. 4 shows the antenna characteristic according to a second switch position of the switching device.

On the other hand, if in switch position 2 an in-phase high-frequency signal is supplied to first supply line 11 and to second supply line 12 (switch position Δ—difference), then the "difference" antenna characteristic having two beam cones is produced as shown in FIG. 4.

Figure 5:
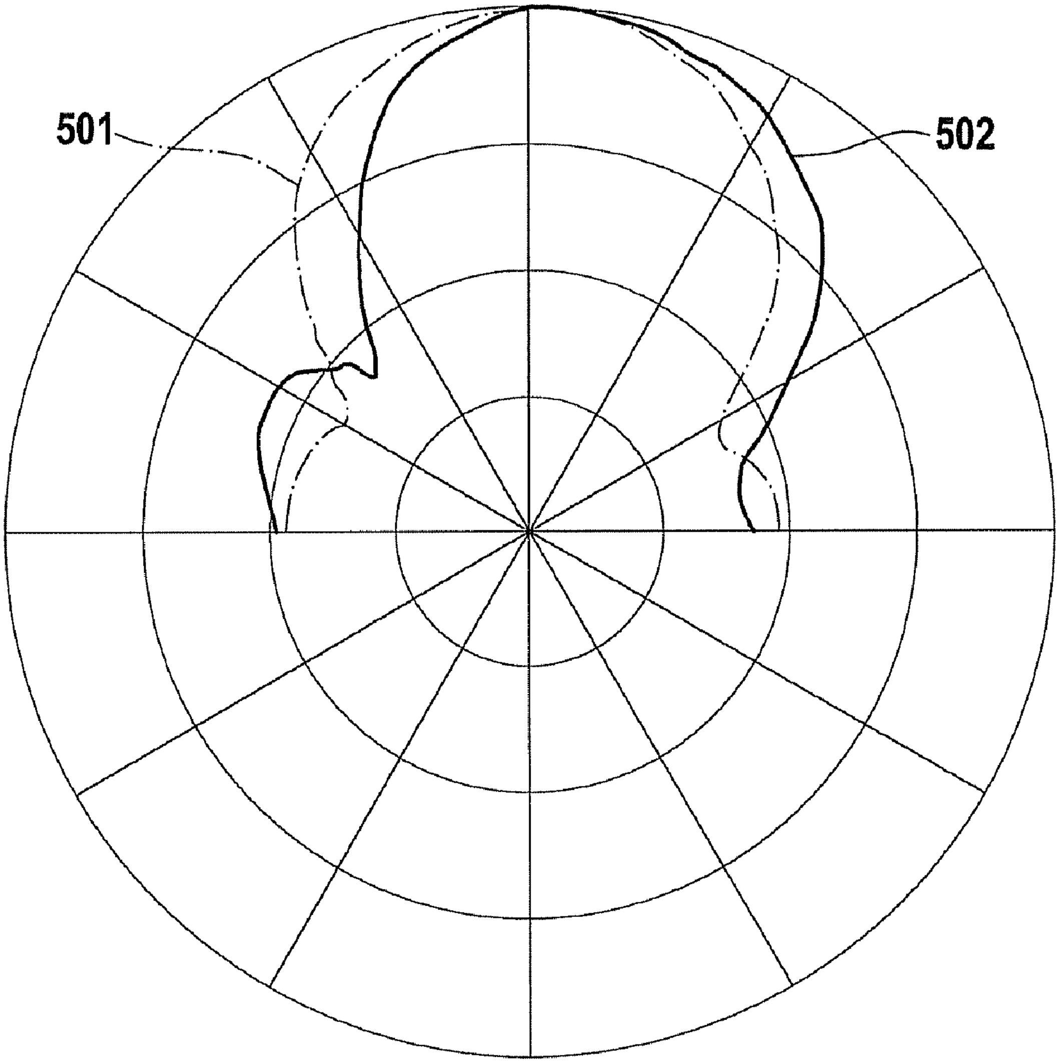
FIG. 5 shows the antenna diagram of a straight beam and of a beam swiveled by 10°.

A beam swivel by up to +10° may be achieved by controlling the amplitude of the high-frequency signal applied on supply terminal 12. In FIG. 5, a dot-dash line 501 shows a non-swiveled antenna characteristic having a high-frequency signal on supply line 11 and having a high-frequency signal of the same amplitude and a phase shift of 180° on supply line 12. Line 502 represents an antenna characteristic swiveled by 10°, in which second supply line 12 has a high-frequency signal applied to it, having an amplitude corresponding to half the amplitude of the signal supplied to first supply line 11, and again having a 180° phase shift between the two supply lines 11, 12. Depending on the choice of amplitude, a rotation of the antenna characteristic may be achieved.

In addition to primary exciter patches 11, 12, parts of an integrated circuit are positioned on carrier 5, for example circuit configuration 100 or other or additional circuit devices.

The antenna array is operated for example at a working frequency of 122 GHz. Typical dimensions at this working frequency are for example the following length and width ratios of primary exciter patches 10, 20: 295 μm×160 μm, secondary exciter patches 51, 52 in this case having length and width ratios of 1050 μm×400 μm for example. The distance between the primary and secondary exciter patches is approximately 100 μm. As may be gathered in particular from FIG. 1 and FIG. 2, secondary exciter patches 51, 52 are situated at a distance A in such a way that a space or a gap remains free between them, which exposes the joint ground contact 40 of the adjoining primary exciter patches 10, 20 in the beam direction.

It should be pointed out as well that secondary exciter patches 51, 52 may be situated on both sides of carrier 59. The arrangement is a function of the frequency and the application.

In summary it may be said that the above-described design of the antenna array according to the present invention and the circuit configuration for operating such an antenna array make it possible to implement a monopulse operation for producing different antenna characteristics in an antenna that is very advantageously able to be developed or situated on a chip.

What is claimed is:

1. An antenna array for a radar transceiver for ascertaining at least one of distance and speed in surroundings of a vehicle, comprising:

a first antenna part situated on a first carrier, the first antenna part including two generally rectangular primary exciter patches which adjoin each other on one edge where they are short-circuited to ground, each of the two primary exciter patches having a separate supply line; and a second antenna part situated on a second carrier, at a distance from the first carrier, the second antenna part including two mutually separated rectangular secondary exciter patches which partially cover the primary exciter patches and which have in a region of the ground short-circuit of the primary exciter patches in the beam direction a distance from each other that at least exposes the ground short-circuit.

2. The antenna array as recited in claim 1, wherein the carrier carrying the primary exciter patches is one of a chip, a circuit board, a soft board substrate or a circuit film.

3. The antenna array as recited in claim 1, wherein the carrier carrying the secondary exciter patches is one of a circuit board, a soft board substrate or a circuit film.

4. The antenna array as recited in claim 1, wherein the first and second carriers are fastened to each other and mutually contacted by flip-chip connections.

5. The antenna array as recited in claim 1, wherein both secondary exciter patches are situated at least one of on a top side and on a bottom side of the second carrier.

6. The antenna array as recited in claim 1, wherein the supply lines of the primary exciter patches are connected on longitudinal edges of the primary exciter patches, a terminal position of the supply lines being selectable depending on a desired, specifiable impedance of the antenna array.

7. The antenna array as recited in claim 1, wherein a space between the first and second carriers is filled by an encapsulating material embedding the primary exciter patches and the secondary exciter patches, the encapsulating material being one of a silicone gel or an underfiller on epoxide resin.

8. A circuit device for supplying primary exciter patches of an antenna array, the antenna array including a first antenna part situated on a first carrier, the first antenna part including two generally rectangular primary exciter patches which adjoin each other on one edge where they are short-circuited to ground, each of the two primary exciter patches having a separate supply line, and a second antenna part situated on a second carrier, at a distance from the first carrier, the second antenna part including two mutually separated rectangular secondary exciter patches which partially cover the primary exciter patches and which have in a region of the ground short-circuit of the primary exciter patches in the beam direction a distance from each other that at least exposes the ground short-circuit, the circuit device comprising:

a switching device in which in one switch position a high-frequency signal is applicable to the supply terminal of the first exciter patch and a high-frequency signal having a phase shift of 180° is applicable to the supply terminal of the second primary exciter patch, and in the second switch position of which respectively an in-phase high-frequency signal is applicable on the first supply line of the first primary exciter patch and on the second supply line of the second primary exciter patch.

9. The circuit device as recited in claim 8, wherein an amplitude of the high-Frequency signal applied on at least one supply terminal in the first switch position of the switching device is adjustable for swiveling a beam cone.

* * * * *

UNITED STATES PATENT AND TRADEMARK OFFICE

CERTIFICATE OF CORRECTION

PATENT NO. : 8,390,521 B2
APPLICATION NO. : 12/808079
DATED : March 5, 2013
INVENTOR(S) : Hasch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 449 days.

Signed and Sealed this
First Day of September, 2015

Michelle K. Lee
*Director of the United States Patent and Trademark Office*